United States Patent [19]
Hartman et al.

[11] Patent Number: 5,386,628
[45] Date of Patent: * Feb. 7, 1995

[54] METHOD OF MAKING A DIFFUSION BONDED ROCKET CHAMBER

[75] Inventors: Mark L. Hartman, Tequesta; Daniel A. Bales, Palm City, both of Fla.

[73] Assignee: United Technologies Corporation, Hartford, Conn.

[*] Notice: The portion of the term of this patent subsequent to Dec. 13, 2011 has been disclaimed.

[21] Appl. No.: 812,319

[22] Filed: Dec. 23, 1991

[51] Int. Cl.[6] ............................................. B23P 15/00
[52] U.S. Cl. ............................ 29/890.01; 29/890.038; 165/170
[58] Field of Search ................... 29/890.01, 890.038, 29/890.04, 890.043, 890.42, 890.053; 165/170, 166, 134.1; 228/193, 195, 183, 181

[56] References Cited

U.S. PATENT DOCUMENTS

| | | | |
|---|---|---|---|
| 2,958,183 | 11/1960 | Singelmann | 29/890.01 |
| 3,069,850 | 12/1962 | Ledwith et al. | 29/890.01 |
| 3,086,358 | 4/1963 | Tumavicus | 29/890.01 |
| 3,190,070 | 6/1965 | Neu, Jr. | 29/890.01 |
| 3,224,678 | 12/1965 | Rosman | 29/890.01 |
| 3,349,464 | 10/1967 | Becker, Jr. et al. | 29/890.01 |
| 3,690,103 | 9/1972 | Dederra et al. | 29/890.01 |
| 3,714,695 | 2/1973 | Beeson | 29/890.01 |
| 3,897,316 | 7/1975 | Huang | 29/890.01 |
| 4,531,271 | 7/1985 | Lechner et al. | 29/890.01 |
| 4,942,653 | 7/1990 | Hawkinson | 29/890.01 |

*Primary Examiner*—Irene Cuda
*Attorney, Agent, or Firm*—Christopher T. Hayes

[57] ABSTRACT

A method of producing a rocket thrust chamber includes positioning cooling tubes within a structural jacket to form a tube bundle, and positioning a mandrel within the tube bundle thereby sandwiching the tubes between the jacket and the mandrel. The tubes are then inflated at high temperature into intimate contact with adjacent tubes and the jacket, and the temperature is maintained until bonding has occurred between the tubes and jacket.

12 Claims, 4 Drawing Sheets

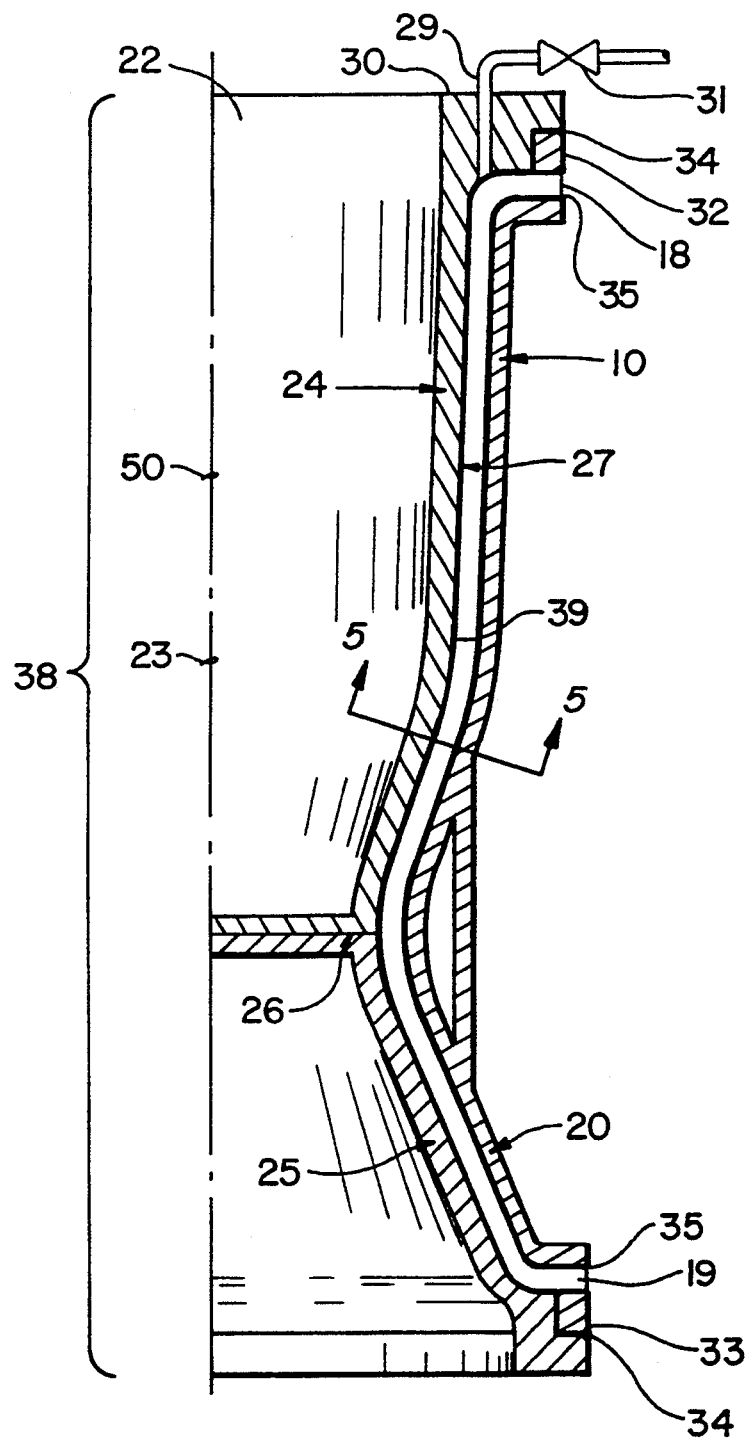
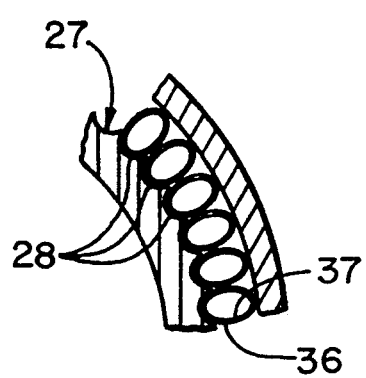

METHOD OF MAKING A DIFFUSION BONDED ROCKET CHAMBER

DESCRIPTION

1. Field of the Invention

This invention is related to heat exchangers, and particularly to a process for forming tubular heat exchangers.

2. Background of the Invention

Rocket engines, such as those used on space missions, are costly to design and manufacture. In addition, there is a continuing and growing need for rockets capable of carrying payloads to space or near-Earth orbits. Consequently, manufacturers of such rocket engines are constantly seeking new ways to reduce the cost of producing the components which go into a rocket engine.

One such component is the rocket thrust chamber within which the propellants of the rocket engine are combusted and accelerated. Because of the extremely high temperatures of the propellants moving through the thrust chamber, the walls of the thrust chamber must be cooled in those applications which require sustained engine firings. Such cooling is typically accomplished by flowing a coolant through tubes or channels which form the inner surface of the thrust chamber.

A typical example of such thrust chambers is shown in U.S. Pat. No. 3,208,132 to Escher, which discloses a rocket chamber produced by forming coolant flow passages within two sheets by an explosive forming process. The formed sheets must be subsequently welded or brazed together to form individual flow passages, and the integrity of these welds is difficult to inspect. U.S. Pat. No. 3,190,070 to Neu discloses a rocket chamber formed from a plurality of pre-formed coolant tubes. The tubes must be manufactured to close tolerances to ensure that the resulting tube bundle adequately shields the structural jacket of the chamber from the combustion products. U.S. Pat. No. 3,595,025 to Stockel et al discloses a rocket chamber liner having grooves which, when mated with a structural jacket, form cooling channels. These grooves must be machined into the liner, and therefore require a significant amount of labor to produce.

What is needed is a method of making a rocket thrust chamber which permits less exacting tube tolerances, and is less labor intensive, than the prior art, and is readily inspectable.

SUMMARY OF THE INVENTION

It is therefore an object of the present invention to provide a process for forming a rocket thrust chamber which provides for secure bonds between adjacent coolant tubes and a simple manufacturing technique. A plurality of tubes are placed side by side against a structural jacket forming a tube bundle therein. Each end of each tube is sealed to the jacket, and a mandrel is placed within the tube bundle. The entire apparatus is then placed into a furnace such as a hot isostatic press (HIP) chamber and heated to a temperature at which the tubes can be readily subjected to substantial plastic or superplastic deformation. The HIP chamber is then pressurized causing the tubes to expand and deform into intimate contact with the structural jacket and the adjacent tubes. The pressure and temperature are maintained until the tubes have bonded to each other and to the structural jacket. The apparatus is then cooled back to room temperature and the pressure is reduced to ambient. The mandrel is then removed from the tube bundle, yielding a completed thrust chamber.

The foregoing and other features and advantages of the present invention will become more apparent from the following description and accompanying drawings.

BRIEF DESCRIPTION OF THE DRAWINGS

FIG. 4 is the structural jacket and tubes of FIG. 2 with the mandrel positioned therein.

FIG. 5 is a cross-sectional view of the assembly in FIG. 4 taken along line 5—5.

BEST MODE FOR CARRYING OUT THE INVENTION

Figure 1:
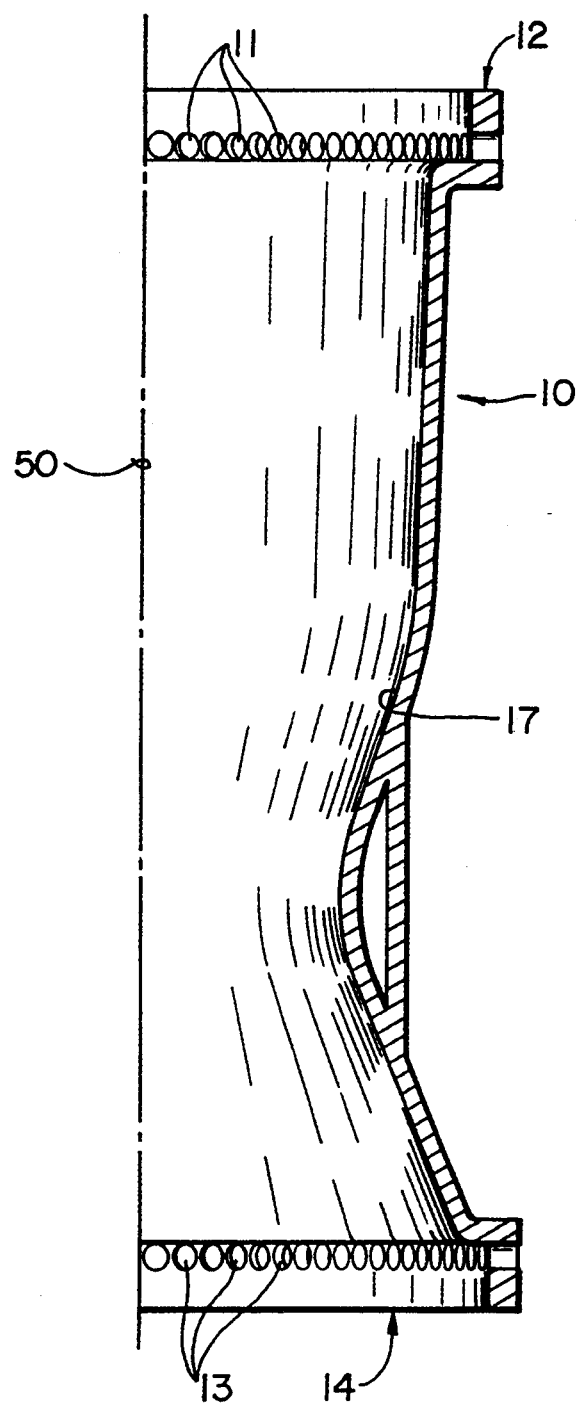
FIG. 1 is cross-sectional view of the structural jacket of the rocket thrust chamber of the present invention.

A structural jacket 10 of a rocket thrust chamber is shown in FIG. 1 with an axial centerline 50 so defined therethrough. Although the present invention is shown and described in terms of a rocket thrust chamber, such discussion is for exemplary purposes only and is not intended to limit the scope of the claims. The structural jacket 10 includes a plurality of inlet manifold holes 11 radially encompassing one end 12 of the jacket 10 and an equal number of manifold exit holes 13 radially encompassing the opposite end 14 of the structural jacket 10. Due to its structural nature, the jacket 10 is preferably made of a high tensile material such as stainless steel.

Figure 2:
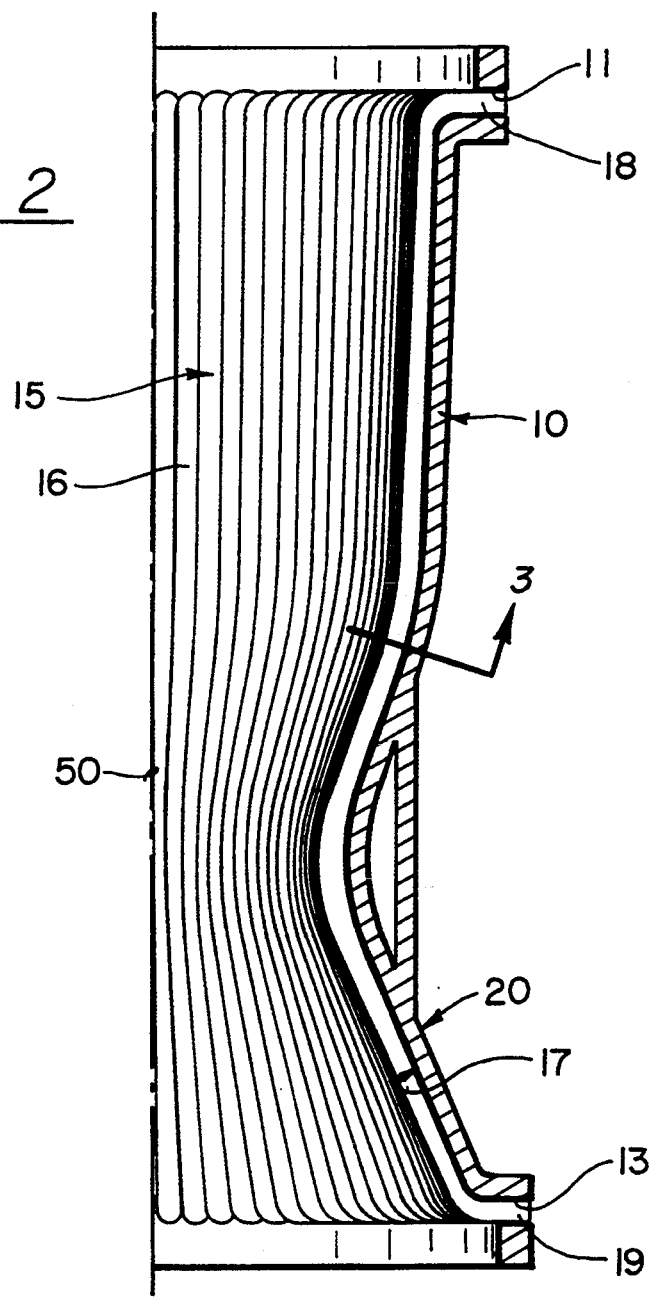
FIG. 2 is structural jacket of FIG. 1 showing one of the tubes positioned therein.
Figure 3:
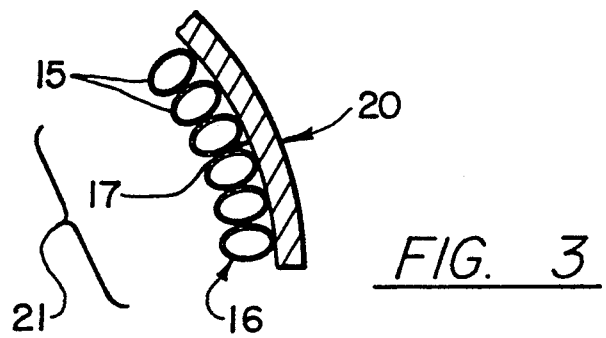
FIG. 3 is a cross-sectional view of the assembly in FIG. 2 taken along line 3—3.

A plurality of tubes 15, each having an outer diameter 16 slightly less than the inlet and outlet holes 11, 13, are formed into a shape which conforms to the axial profile of the inner surface 17 of the structural jacket 10, as shown in FIG. 2. The tubes 15 are preferably made of a high conductivity material such as copper or a copper alloy. Each such tube 15 is placed within the structural jacket 10 so that the tube 15 extends axially along the structural jacket 10. One end 18 of each tube 15 is then inserted through one of the inlet holes 11 and the other end 19 is inserted through one of the outlet holes 13. The end 18, 19 of each tube is then sealed, preferably by welding, to the structural jacket 10, thereby preventing communication between the inner 17 and outer 20 surfaces of the structural jacket 10 through the inlet and outlet holes 11, 13. The axially aligned tubes 15 thus form a tube bundle 21 along the inner surface 17 of the structural jacket 10, a cross-section of which is shown in FIG. 3.

With the tubes 15 secured to the jacket 10, a two-piece mandrel 22 is inserted into the tube bundle 21 as shown in FIG. 4. The mandrel 22 has a longitudinal axis 23, and the first piece 24 joins to the second piece 25 at the narrowest diameter 26 along the longitudinal axis 23. The outer face 27 of the mandrel 22 is scalloped with a plurality of troughs 28, and the number of troughs 28 is equal to the number of tubes 15. The outer face 27 of the mandrel 22 is preferably coated with a releasing agent and includes one or more purge lines 29 extending from the scalloped face 27, through an end 30 of the mandrel 22. The purge line 29 includes a valve 31 for selectively opening or closing the purge line 29.

With the two-piece mandrel 22 located within the tube bundle 21, the ends 32, 33 of the jacket 10 are sealed to the mandrel 22 about the circumference thereof, preferably by electron beam welding. As a result of the electron beam weld 34 sealing the mandrel 22 to the jacket 10, and the sealing weld 35 of each of the tube ends 18, 19 into one of the inlet or outlet holes 11, 13, the outer surface 36 of each tube 15 communicates with the inner surface 37 of each tube 15 solely through the purge line 29. Likewise, the inner surface 37 of each tube 15, the outer surface 20 of the jacket 10, and the outer face 27 of the mandrel 22 are always at ambient pressure. At this point, the tubes 15 may be checked for leaks by drawing a vacuum on the purge line 29 and passing a helium gas wand around the jacket 10 and mandrel 22, and detection equipment in the vacuum apparatus is used to determine whether helium is leaking into the vacuum void. Once it has been determined that no leaks are present, the purge line 29 may be used to perform hydrogen scrub cycles, and then the purge line 29 is used to evacuate the gas from the isolated volume 39 between the mandrel 22 and the structural jacket 10. Once evacuated, the purge line 29 is closed, thereby isolating the tube outer surfaces 36, the structural jacket inner surface 17 and the mandrel outer face 27 from atmospheric pressure. The resulting configuration of the mandrel 22, tubes 15, and jacket 10, is shown in cross-section in FIG. 5.

Figure 6:
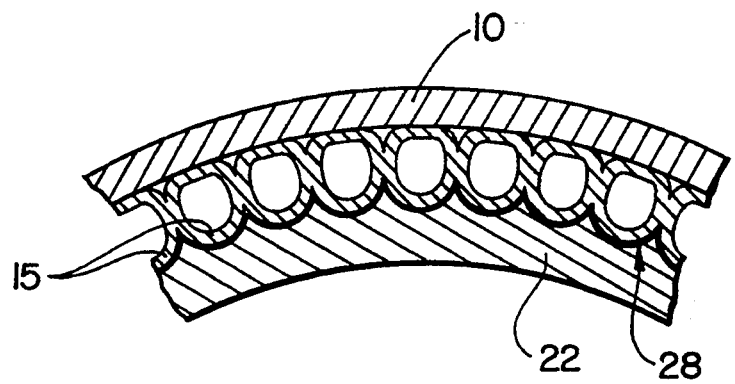
FIG. 6 is the cross-sectional view of FIG. 5 showing the deformation of the tubes between the jacket and mandrel.
Figure 7:
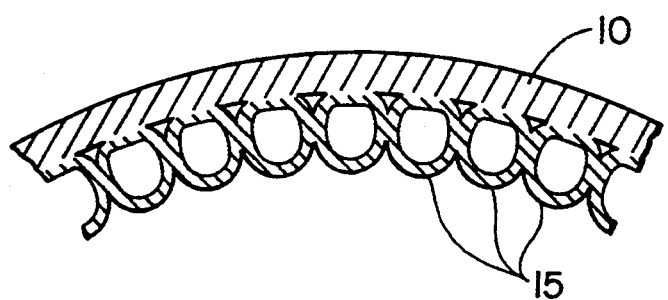
FIG. 7 is the view in FIG. 6 after diffusion bonding of the tubes and jacket, and removal of the mandrel.

At this point the assembly 38 is placed into a hot isostatic pressure (HIP) chamber and raised to a required temperature at which plastic or superplastic deformation of the tubes 15 can occur. The chamber is then pressurized to high pressure (typically 500 psi–30 ksi) thus pressurizing each tube 15. Since the outer surface 36 of each tube 15 is acted upon by a vacuum, each tube 15 expands against the surrounding tubes 15, jacket 10, and mandrel 22, deforming in the process into intimate contact with the adjacent tubes 15 and the structural jacket 10. These conditions are maintained until the tubes 15 diffusion bond to each other and to the structural jacket 10. The tubes 15 do not diffusion bond to the mandrel 22 because of the releasing agent which prevents the tubes 15 from bonding within the troughs 28. The resulting deformation is shown in FIG. 6. After the diffusion bonding is completed, the temperature and pressure are reduced to ambient and the assembly 38 is removed from the HIP chamber. The circumferential welds 34 are then machined from the structural jacket 10, allowing the mandrel 22 to be removed. The resulting thrust chamber is a tube bundle 21 and integral jacket 10 as shown in FIG. 7. Any portion of the tube ends 18, 19 which extends outward from the inlet and outlet holes may be machined away to achieve a smooth orifice manifold.

As an alternative to diffusion bonding, the tubes 15 and/or jacket 10 may be plated with a braze material prior to positioning the tubes 15 within the structural jacket 10. After inflation of the tubes 15 into intimate contact with adjacent tubes 15 and the jacket 10, the temperature is increased to braze temperature, thereby brazing the tubes 15 and jacket 10 together.

Although this invention has been shown and described with respect to detailed embodiments thereof, it will be understood by those skilled in the art that various changes in form and detail thereof may be made without departing from the spirit and scope of the claimed invention.

I claim:

1. A method of making a component having tubular passages therein comprising:
    providing a structural jacket having first and second opposed ends and a plurality of first and second holes extending through the jacket adjacent the first and second ends, respectively;
    positioning a plurality of tubes within the jacket, each tube having a first tube end positioned in one of the first holes and a second tube end positioned in one of the second holes, thereby forming a tube bundle;
    sealingly welding the jacket to each tube end at each hole thereby plugging each hole with the tube therein;
    positioning a mandrel within the tube bundle;
    sealingly welding the perimeter of the first and second ends of the jacket to the mandrel, thereby defining an isolated volume bounded by the mandrel, the jacket, and the outside of each of the tubes, said isolated volume communicating with the outer surface of the jacket solely through a purge line;
    evacuating the isolated volume and sealing the purge line;
    placing the jacket, tubes and mandrel as an assembly into a hot isostatic pressure chamber and heating the assembly to a temperature at which plastic or superplastic deformation of the tubes can take place;
    raising the pressure of the chamber thereby inflating each tube into intimate contact with immediately adjacent tubes, the jacket, and the mandrel; and,
    maintaining the pressure and temperature until each of the tubes bonds to the adjacent tubes and the inner surface of the jacket.

2. The method of claim 1 wherein the jacket and each of the tubes is coated with braze material prior to the step of positioning the tubes within the jacket, and the step of maintaining the pressure and temperature is preceded by the step of:
    heating the assembly to the braze temperature of the braze material.

3. The method of claim 2 wherein the mandrel has a coating of release agent to prevent the tubes from bonding to the mandrel.

4. The method of claim 3 wherein the mandrel has a longitudinal axis defined therethrough and a scalloped outer face including a plurality of axially extending troughs equal in number of tubes, and the purge line communicates with the outer face, extends through the mandrel, and protrudes therefrom through a second face of the mandrel.

5. The method of claim 4 wherein the purge line includes a valve for selectively opening and closing the purge line.

6. The method of claim 1 wherein the step of maintaining the pressure and temperature is preceded by the step of:
    heating the assembly to the a temperature at which the tubes diffusion bond together.

7. The method of claim 6 wherein the mandrel has a coating of release agent to prevent the tubes from bonding to the mandrel.

8. The method of claim 7 wherein the mandrel has a longitudinal axis defined therethrough and a scalloped outer face including a plurality of axially extending troughs equal in number of tubes, and the purge line communicates with the outer face, extends through the mandrel, and protrudes therefrom through a second face of the mandrel.

9. The method of claim 8 wherein the purge line includes a valve for selectively opening and closing the purge line.

10. A method of making a rocket chamber comprising:

providing a structural jacket spaced radially outward from a centerline defined therethrough, said jacket including an inner surface, and an outer surface radially outward from said inner surface, said inner and outer surfaces extending between first and second opposed ends of said jacket, and a plurality of first holes adjacent the first end and an equal plurality of second holes adjacent the second end, said first and second holes extending from said inner surface to said outer surface;

providing a plurality of tubes, each tube having first and second tube ends and a length great enough to extend between one of the first holes and one of the second holes, each tube shaped along the length thereof to conform to the inner surface between said one of said first holes and said one of said second holes;

providing a two-piece mandrel comprising a first piece which mates with a second piece, said mandrel having a longitudinal axis, and a scalloped outer face including a plurality of axially extending troughs equal in number to the plurality of tubes, said mandrel including at least one purge line extending from the outer face through a second face of the mandrel, said purge line including a valve for selectively opening and closing the purge line, said two-piece mandrel having a narrowest diameter along the longitudinal axis, and said first piece mates to said second piece at the narrowest diameter;

positioning the first tube end of each of said plurality of tubes into one of the first holes and the second tube end of each of said plurality of tubes into one of the second holes, thereby forming a tube bundle;

sealingly welding the jacket to each tube end at each hole to prevent fluid from flowing through each hole outside of the tube positioned therein;

positioning the two-piece mandrel within the tube bundle with one of said tubes located radially outward from each of said troughs and securing the first piece to the second piece;

sealingly welding the perimeter of the first and second ends of the jacket to the mandrel, thereby defining an isolated volume bounded by the outer face of the mandrel, the inner surface of the jacket, and the outside of each of the tubes, said isolated volume communicating with the outer surface of the jacket solely through said purge line;

evacuating the isolated volume and closing the valve;

placing the jacket, tubes and mandrel as an assembly into a hot isostatic pressure chamber and heating the assembly to a temperature at which significant plastic deformation of the tubes can take place;

raising the pressure of the chamber thereby inflating each tube into intimate contact with immediately adjacent tubes, the inner surface of the jacket, and the outer face of the mandrel;

maintaining the pressure and temperature until each of the tubes bonds to the adjacent tubes and the inner surface of the jacket.

11. The method of claim 10 wherein the jacket and each of the tubes is plated with braze material prior to the step of positioning the tubes within the jacket, and the step of maintaining the pressure and temperature is preceded by the step of:

heating the assembly to the braze temperature of the braze material.

12. The method of claim 11 wherein the step of maintaining the pressure and temperature is preceded by the step of:

heating the assembly to the a temperature at which the tubes diffusion bond together.

* * * * *